May 20, 1924.

C. H. ADELMAN

DENTAL TOOL

Filed Jan. 8, 1923

1,494,327

Charles H. Adelman
INVENTOR

Patented May 20, 1924.

1,494,327

UNITED STATES PATENT OFFICE.

CHARLES H. ADELMAN, OF PITTSBURGH, PENNSYLVANIA.

DENTAL TOOL.

Application filed January 8, 1923. Serial No. 611,272.

*To all whom it may concern:*

Be it known that I, CHARLES H. ADELMAN, a citizen of the United States, residing at Pittsburgh, in the county of Allegheny and State of Pennsylvania, have invented a new and useful Improvement in Dental Tools, of which improvement the following is a specification.

My invention relates to improvements in dental tools and particularly to means for controlling the supply of water to or upon a grinding bur mounted in the upper end of the dental hand piece. The object of my invention is to provide a means for controlling the supply of water to said bur which is under the ready control of the operator at all times. I accomplish this object by means of the device hereinafter more specifically described, reference being had to the accompanying drawings forming part hereof, in which Fig. 1 is an elevation of a dental hand piece with my improvement applied thereto.

Figure 1:
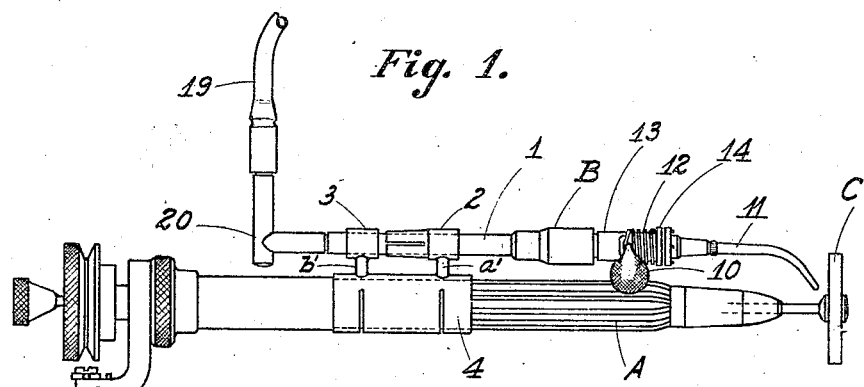
Figure 2:
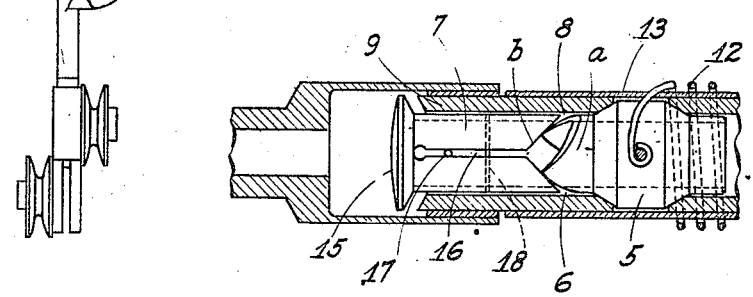
Fig. 2 is a fragmentary sectional elevation of the control mechanism showing the valve thereof in open position.
Figure 3:
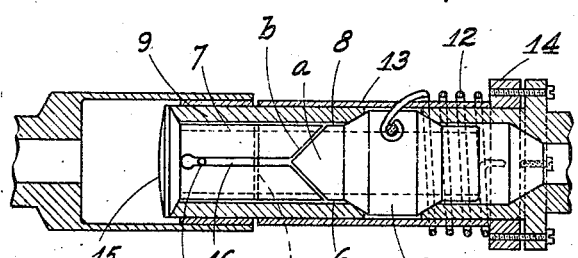
Fig. 3 is the same showing the valve in closed position.
Figure 4:
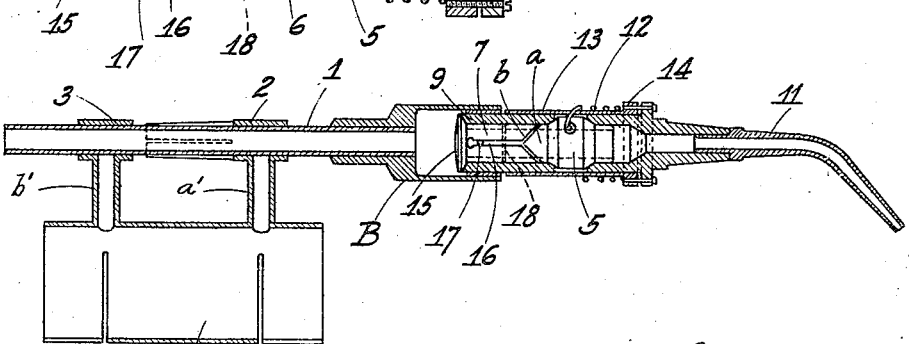
Fig. 4 is a longitudinal sectional elevation of the water control mechanism.

Referring to said drawings, "A" is the usual dental hand piece. "B" is my improved mechanism for controlling the flow of water used with said hand piece. The said mechanism comprises a cylinder (1) which is attached or mounted upon the dental hand piece by means of the collars (2, 3) which project from and are integral with the split thimble (4) which encircles the said hand pieces, the said collars being attached to said split thimble by means of the posts a', b'. A valve mechanism which comprises the rotatable member (5), the major portion of which is seated in the chamber (6) and the reciprocating plunger (7) which is seated in the chamber (8) formed in the sleeve (9). The ends of said sleeve are beveled and adapted to engage upon respectively the corresponding portion of the member (5) and the beveled underside of the plunger (7). The said rotatable member (5) comprises a cylindrical body, the central portion of which is considerably enlarged and the surface extending from both sides thereof towards the ends respectively are beveled, the end adjacent to the plunger terminating in a cylindrical portion "a," the sides of which are cut off as shown in Fig. 2, and are adapted to, when the valve is closed, be seated snugly against the correspondingly shaped end "b" of the plunger (7) as shown in Fig. 3. The enlarged portion of said member (5) is provided with a finger lever (10) whereby the said member is capable of being rotated for the purpose of opening and closing the valve mechanism, and thus supplying or cutting off water to the bur (C) which is mounted in the forward end of the dental hand piece. The said water control mechanism, is provided with a nozzle (11), the outer end of which terminates a short distance from the inner side of the said bur. A coiled spring (12) is mounted upon the cylinder (13) which surrounds said member (5), one end of said spring being secured upon the stem of the lever, and the opposite end in the collar (14). The tension of said spring is sufficient to return the member (5) to normally closed position as shown in Fig. 3.

The plunger (7) comprises a cylindrical body, the ends of which adjacent to the member (5) are formed correspondingly therewith. The opposite end of said plunger terminates in an enlarged portion (15) which constitutes the plunger head. The said plunger has formed therein a slot (16) which extends from the lower portion of the V shaped end towards the head of the plunger. A pin (17) is seated in the walls of the sleeve (9), and passes through said slot for the purpose of preventing said plunger rotating. A pin (18) extends at right angles to said first mentioned pin, the ends of said last mentioned pin (18) being secured in the walls of the plunger, and is adapted to engage against the pin (17) and thus limit the backward movement of the plunger. A flexible tube or hose (19) is connected to said control mechanism by means of the L connection (20) for the purpose of supplying water thereto.

The operation of the device is as follows: The hand piece being gripped by the operator so that the operator's forefinger rests upon the finger lever, downward pressure upon said lever opens the valve mechanism as shown in Fig. 2, and permits water to be discharged from a source connected to said water control mechanism. By removing pressure on the finger lever, the valve instantly closes.

Having described my invention, what I claim and desire to secure by Letters Patent is:

1. A dental tool consisting of tubular shell and valve mechanism located therein, comprising a hollow reciprocatory cylindrical member, one end of which constitutes the valve seat, and a hollow cylindrical rotatable member, the said rotatable member having a finger lever, and the said members being so associated that the rotation of one member reciprocates the other member and unseats the valve.

2. A dental tool consisting of a tubular shell and valve mechanism located therein, comprising a hollow reciprocatory cylindrical member, one end of which constitutes the valve seat, and a hollow cylindrical rotatable member, the said rotatable member having a finger lever and means connected with said finger lever for returning said member to normal position, the said members being so associated that the rotation of one member reciprocates the other member and unseats the valve.

In testimony whereof, I have hereunto signed my name in the presence of two subscribing witnesses.

CHARLES H. ADELMAN.

In the presence of—
JOHN H. RONEY,
CLARENCE A. WILLIAMS.